United States Patent [19]

Couture

[11] Patent Number: 4,543,689
[45] Date of Patent: Oct. 1, 1985

[54] METHOD AND APPARATUS FOR REMOVING CHEEK MEAT FROM THE SKULLS OF SLAUGHTERED ANIMALS

[75] Inventor: William F. Couture, Amarillo, Tex.
[73] Assignee: IBP, Inc., Dakota City, Nebr.
[21] Appl. No.: 519,479
[22] Filed: Aug. 1, 1983
[51] Int. Cl.[4] .............................................. A22C 17/02
[52] U.S. Cl. ......................................... 17/46; 17/1 R
[58] Field of Search ................... 17/1 R, 50, 21, 45, 17/46, 11

[56] References Cited

U.S. PATENT DOCUMENTS

| | | | |
|---|---|---|---|
| 1,561,547 | 11/1925 | Karpenko | 17/1 R |
| 2,725,593 | 12/1955 | Truffaut | 17/45 |
| 2,994,908 | 8/1961 | Fill | 17/1 R |
| 3,084,378 | 4/1963 | Macy et al. | 17/1 |
| 3,213,489 | 10/1965 | Walsh | 17/21 |
| 3,811,152 | 5/1974 | Herubel | 17/1 R |
| 3,890,673 | 6/1975 | Neubauer | 17/1 A |
| 4,052,769 | 10/1977 | Thillet et al. | 17/23 |
| 4,237,580 | 12/1980 | Croasdell | 17/45 |

Primary Examiner—Willie G. Abercrombie
Attorney, Agent, or Firm—Beveridge, DeGrandi & Weilacher

[57] ABSTRACT

Cheek meat is removed from the skull of a slaughtered animal by a method and apparatus wherein the skull is held at a given orientation in a skull-holding device; a hook is brought into engagement with the cheek meat; and, an actuator produces forcible relative movement between the hook and the skull to strip the cheek meat from the skull.

20 Claims, 5 Drawing Figures

METHOD AND APPARATUS FOR REMOVING CHEEK MEAT FROM THE SKULLS OF SLAUGHTERED ANIMALS

BACKGROUND OF THE INVENTION

This invention relates to a method and apparatus for removing meat from the skull of a slaughtered animal.

In the beef processing industry, meat is often removed from the skull of a slaughtered animal by a worker who uses a knife to sever the meat from the skull. The removal of the cheek meat is often incomplete so that residual amounts of meat remain on the skull.

A primary object of this invention is to remove the cheek meat from the skull in the manner which will provide a greater yield of meat than was heretofore possible, and will minimize the residual amount of meat left on the skull. A further object is to provide an apparatus for this purpose which is efficient, uncomplicated and relatively inexpensive to manufacture.

SUMMARY OF THE INVENTION

In one respect, the invention involves an apparatus which is provided with skull holding means for holding the skull at a given orientation, a hook which is movable relative to the skull from a disengaged position which is spaced from the cheek meat on the skull to an engaged position where the hook is in contact with the cheek meat, and actuator means for producing forcible relative movement between the hook and the skull so that the hook, when engaged with the cheek meat, will strip the cheek meat from the skull.

In a more specific sense, the invention involves an apparatus in which two such hooks are located on the opposite sides of the skull to remove the cheek meat from both sides of the skull. Each of the hooks has a handle and a plurality of projections which engage the cheek meat. These projections are spaced apart and disposed in a pattern which is bowed convexly toward the skull-holding means. The actuator means is a fluid operated cylinder provided with a counterbalance means which exerts a lifting force on the cylinder.

Preferably, the skull-holding means comprises means for engaging the forward end of the skull, means for engaging the rear end of the skull, and means for producing relative movement between these means to retain a skull in the skull holding means. The means for engaging the rear end of the skull preferably includes a surface which bears against the exterior of the head, and a pin which projects into the atlas joint of the skull to prevent transverse movement of the rear end of the skull.

The forward end of the skull is preferably held in a forward receptacle. The relative movement is between a closed position where the forward nose portion is held in the receptacle and an open position where the spacing between the receptacle and the member which engages the rear end of the skull permits rearward movement of the skull to remove the forward nose portion thereof from the receptacle.

In another respect, the invention involves a method of removing cheek meat from the skull of an animal. This method is performed by holding the skull at a given orientation, moving a hook to a position where it is in contact with the cheek meat, and producing relative movement between the hook and the skull to strip the cheek meat from the skull. Preferably, before the cheek meat is stripped from the skull, the masseter tendons of the cheek meat are cut adjacent to the skull. The skull is held by engaging the forward end of the skull with a forward member and engaging the rear end of the skull with a rear member. More specifically, the skull-holding step is performed by placing a forward nose portion of the skull in a forward receptacle member, engaging the rear end of the skull with a rearward holdback member, and relatively moving these members to a closed position where the forward nose portion is held in the receptacle. The cheek meat is stripped from the skull while these members are in the closed position. Subsequently, the members are moved apart to an open position and the skull is moved rearwardly to remove its forward nose portion from the receptacle.

Although the invention may be practiced in many ways, a preferred embodiment is illustrated in the accompanying drawings and described in the following text.

DETAILED DESCRIPTION

Figure 1:
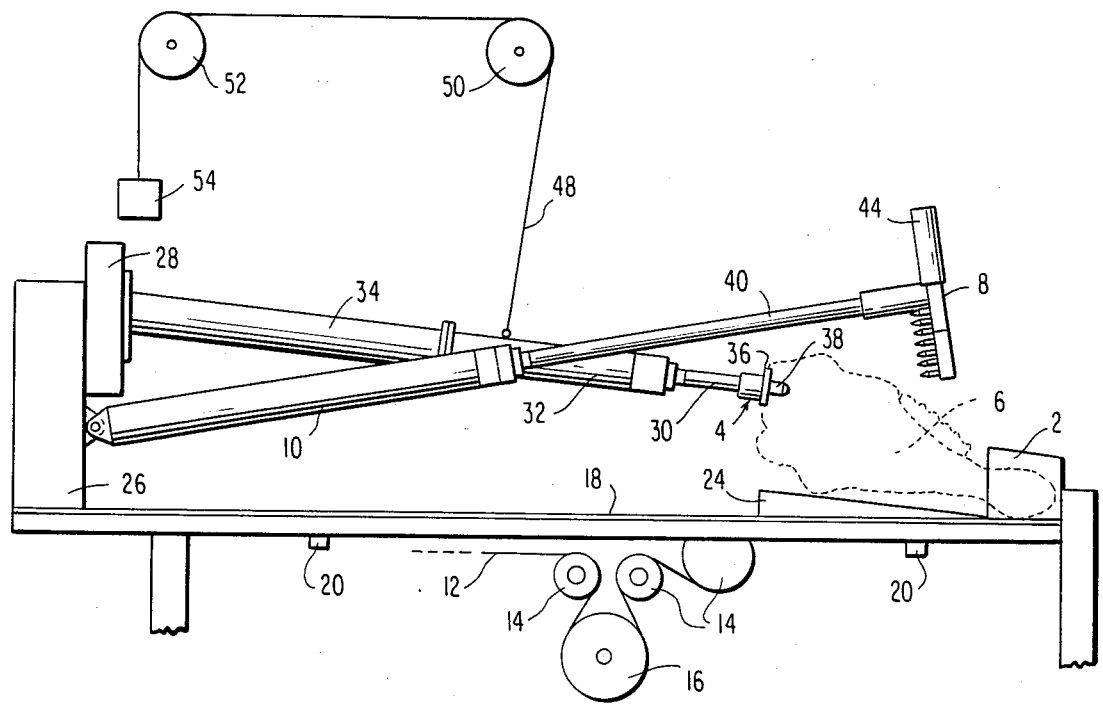
FIG. 1 is an elevational view of an apparatus constructed according to the invention.
Figure 2:
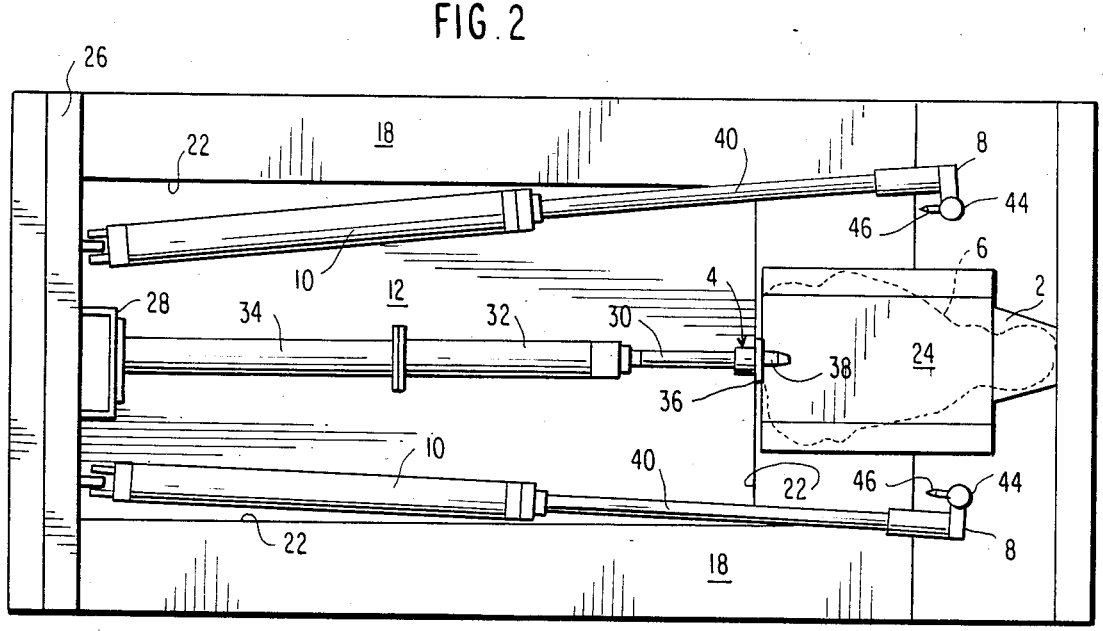
FIG. 2 is a plan view of the apparatus.

Referring to FIGS. 1 and 2 of the drawings, it will be seen that the apparatus has a nose cup 2 and a member 4 which cooperate to hold a skull 6 in a fixed position. A pair of hooks 8, only one of which is seen in FIG. 1, are connected to hydraulic cylinders 10 which are operable to pull the cheek meat forcibly from the skull.

The apparatus is supported on a known type of table provided with a conveyor belt 12 which travels on guide rollers 14 and is driven by a motor-driven roller 16. The table has a stainless steel base plate 18 which is mounted on and supported by members 20. As shown in FIG. 2, the rear portion of the base plate has a large centrally located opening, the edges of which are designated 22. This opening exposes the conveyor belt 12, enabling the belt to receive and carry away pieces of cheek meat which have been pulled from the skull.

At the forward end of the table, there is a stationary wedge-shaped head support 24 and the previously-mentioned nose cup 2 which receives the nose of the skull. At the rear end of the table, there is an upstanding frame 26 which supports a channel 28. A gusset, not shown, reinforces the frame so it is able to withstand the forces encountered during operation of the apparatus.

The member 4 is mounted on the forward end of the rod 30 of a hydraulic cylinder 32. This cylinder 32 is supported at a stationary orientation by a tubular member 34 which is affixed to the channel 28.

The skull-engaging member 4 includes a flange 36 and a pin 38 which extends forwardly from the flange 36. When the cylinder rod 30 is extended, the flange bears against the rear end of the skull to hold the nose of the skull in the nose cup. The pin projects into the atlas joint of the skull to prevent transverse movement of the rear end of the skull.

Figure 3:
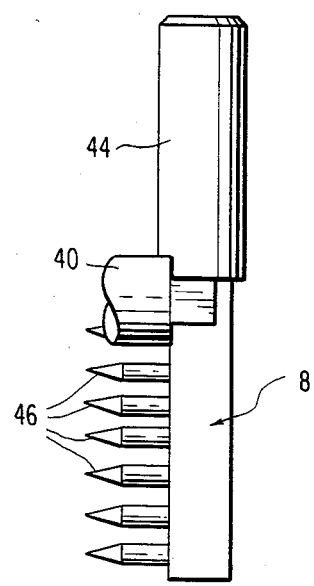
FIGS. 3 and 4, respectively, are side and end views of the hook which engages the cheek meat.
Figure 4:
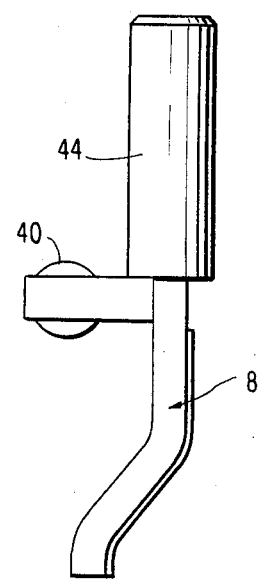

To pull the cheek meat from the opposite sides of the skull, the apparatus is provided with a pair of rearwardly facing hooks 8 which are mounted on the forward ends of the rods 40 of two hydraulic cylinders 10. These hooks are provided with handles 44 which facilitate their manipulation by a worker. The rear end of each cylinder 10 is pivotally connected by a pin to an eye on the frame. As best shown in FIGS. 3 and 4, each hook 8 is provided with a plurality of spike-like projections 46 which are spaced apart and disposed in a pattern which is bowed convexly toward the skull holding means. This pattern corresponds generally to the contour of the bony part of the skull, and it permits the hook to move quite close to the skull without catching on the bone.

As shown in FIG. 1, a counterweight system is provided for each of the cylinders. Only one counterweight system is shown in the drawings. It includes a cable 48 which has its forward end connected to the cylinder 10, a pair of pulleys 50 and 52 which guide the cable, and a counterweight 54 connected to the rear end of the cable. These components are preferably arranged so that the cylinders, when at rest, will be in the position shown in solid lines in FIG. 1. With little effort, a worker may move the hooks 8 downwardly and inwardly so they will engage the cheek meat. The cylinder-supporting eyes have slightly oversized holes which permit some horizontal movement of the cylinders 10 toward the skull.

Figure 5:
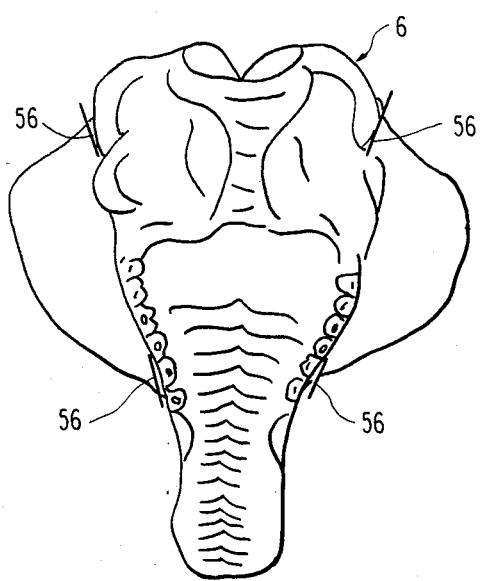
FIG. 5 is a somewhat diagrammatic ventral view of the head, illustrating the location of preliminary cuts which are made before the cheek meat is pulled from the skull.

The method and apparatus may be used in a beef slaughtering facility. After the hide is pulled from a slaughtered animal, the head is removed from the carcass, and the jaw is pulled from the head using an existing jaw pulling device. A worker using head-held rotary power knives removes small areas of the meat from the skull to trim the lean meat from the crown of the head. Using a conventional bladed knife, a worker cuts the lips from the left and right sides of the head and cuts the masseter tendons along the lines designated 56 in FIG. 5. These tendons are cut at four separate places, at the left and right of the front of the head, and on the left and right of the rear of the head. The cutting of these tendons facilitates the stripping of the meat from the skull and minimizes the amount of meat which remains on the skull after completion of the pulling operation.

The head is transferred to the apparatus of the invention where the nose of the skull is placed in the nose cup 2 and the cylinder 32 is actuated to move the member 4 from its retracted position to its extended position where the surface of flange 36 bears against the rear of the head to hold the nose of the skull in the nose cup. The pin 38 projects into the atlas joint to prevent lateral movement of the skull. The worker, using the handles 44, moves the hooks 8 downwardly and inwardly toward the skull until they are aligned or engaged with a forward portion of the cheek meat. The worker then actuates the cylinders 10 to drive the hooks 8 rearwardly and strip the cheek meat from the skull. The two pieces of cheek meat then are removed from the hooks and dropped onto the conveyor belt 12 which carries them to a receptacle or to further processing stations. Release of the meat from the hooks is assisted by momentum when the hooks stop at the rearward end of their travel.

After the cheek meat has been pulled from the skull, the cylinder 32 is actuated to retract the rod 30, placing the skull holding mechanism in an open position where the spacing between the members 2 and 4 permits rearward movement of the skull to remove its nose from the cup 2.

Persons familiar with the art will realize that the invention may take many forms other than the precise disclosed embodiment. For example, it is possible to provide stationary hooks if the head-holding mechanism is movable relative thereto. In view of the many forms which the invention may take, it is emphasized that the invention is not limited solely to the disclosed embodiment but is embracing of numerous other methods and apparatuses within the spirit of the following claims.

I claim:

1. Apparatus for pulling the cheek meat from the skull of a slaughtered animal, comprising, skull holding means for holding the skull at a given orientation along a longitudinal axis, a hook located transversely of said longitudinal axis opposite a cheek meat portion and being laterally movable relative to the skull from a disengaged position which is spaced from the cheek meat on the skull to an engaged position where said hook is in contact with the cheek meat, and actuator means for producing forcible relative movement between the hook and the skull in a direction which extends generally lengthwise of the skull along said longitudinal axis, said actuator means being operable when the hook is engaged with the cheek meat to strip the cheek meat from the skull.

2. Apparatus according to claim 1 wherein the hook has a plurality of projections for engaging the cheek meat, said projections being spaced apart and disposed in a pattern which is bowed convexly toward the skull holding means.

3. Apparatus according to claim 1 wherein the skull holding means includes first means for engaging the forward end of the skull, second means for engaging the rear end of the skull, and means for producing relative movement between said first and second means to retain a skull in the skull holding means.

4. Apparatus according to claim 3 wherein the second means includes a pin which projects into the atlas joint of the skull to prevent transverse movement of the rear end of the skull.

5. Apparatus according to claim 4 wherein the second means is provided with a surface which bears against the exterior of the head, said pin projecting forwardly of said surface.

6. Apparatus according to claim 1 including a handle which is attached to said hook to facilitate manual movement thereof to said engaged position.

7. Apparatus according to claim 1 having conveyor means for receiving the cheek meat from the hook and removing the cheek meat from the apparatus.

8. Apparatus according to claim 1 wherein the actuator means is a fluid operated cylinder, said apparatus having means for exerting a lifting force on said cylinder to counterbalance the weight thereof.

9. Apparatus according to claim 1 wherein the skull holding means includes a forward receptacle member for receiving a forward nose portion of the skull, a rearward holdback member for engaging the rear end of the skull, and means for relatively moving said members from a closed position where the forward nose portion is held in said receptacle to an open position where the spacing between the members permits rearward movement of the skull to remove the forward nose portion thereof from the receptacle.

10. Apparatus according to claim 1 provided with two said hooks which are located on opposite sides of the skull to remove the cheek meat from both sides of the skull.

11. Apparatus according to claim 10 wherein each of said hooks has a plurality of projections for engaging the cheek meat, said projections on each hook being spaced apart and disposed in a pattern which is bowed convexly toward the skull holding means.

12. Apparatus for pulling the cheek meat from the skull of an animal, comprising, skull holding means for holding the skull at a given orientation including a receptacle member for receiving a nose portion of the skull, a rear member for engaging the rear end of the skull, a fluid-operated cylinder connected to the rear member for moving said holdback member from a closed position where it holds the forward nose portion in said receptacle to an open position where the spacing between the members permits removal of the forward nose portion thereof from the receptacle, two hooks located on opposite sides of the skull holding means for removing the cheek meat from both sides of the skull, said hooks being laterally movable relative to the skull from disengaged positions which are spaced from the skull to engaged positions where said hooks are in contact with the cheek meat of the skull, and actuator means for producing forcible movement of the hooks relative to the skull in a direction which extends generally lengthwise of the skull, said actuator means including a fluid-operated cylinder operable when the hooks are engaged with the cheek meat to strip the cheek meat from both sides of the skull.

13. A method of removing cheek meat from the skull of an animal, comprising the steps of, holding the skull at a given orientation along a longitudinal axis, moving a hook that is located transversely of the longitudinal axis and spaced from the cheek meat toward the skull to a position where said hook is in contact with the cheek meat, and producing relative movement between the hook and the skull in a direction which extends generally lengthwise of the skull to strip the cheek meat from the skull.

14. A method according to claim 13 wherein the step of holding the skull is performed by engaging the forward end of the skull with a forward member, and engaging the rear end of the skull with a rear member.

15. A method according to claim 13 wherein the step of holding the skull is performed by placing a forward nose portion of the skull in a forward receptacle member, engaging the rear end of the skull with a rearward holdback member, and relatively moving said members to a closed position where the forward nose portion is held in said receptacle, said members being in said closed position when the cheek meat is stripped from the skull; and, after the cheek meat is stripped from the skull, moving said members apart to an open position, and moving the skull rearwardly to remove the forward nose portion thereof from the receptacle.

16. A method according to claim 13 wherein, before stripping the cheek meat from the skull, the masseter tendons of the cheek meat are cut adjacent to the skull.

17. A method according to claim 13 wherein the hook has more than three projection means thereon for engaging the cheek meat, and the step of producing relative movement between the hook and the skull is performed while more than three said projection means are simultaneously engaged with the cheek meat.

18. Apparatus for pulling the cheek meat from the skull of a slaughtered animal, comprising, skull holding means for holding the skull at a given orientation along a longitudinal axis, a hook located transversely of said cheek meat and being provided with more than three projection means for simultaneously engaging the cheek meat, said hook being laterally movable relative to the skull from a disengaged position which is spaced from the cheek meat on the skull to an engaged position where said hook is in contact with the cheek meat, and actuator means for producing forcible relative movement between the hook and the skull in a direction which is generally lengthwise of the skull, said actuator means being operable when the hook is engaged with the cheek meat to strip the cheek meat from the skull.

19. Apparatus according to claim 18 wherein the projections are disposed in a pattern which is bowed convexly toward the skull holding means.

20. Apparatus according to claim 18 wherein the skull holding means includes first means for engaging the forward end of the skull, second means for engaging the rear end of the skull, and means for producing relative movement between said first and second means to retain a skull in the skull holding means.

* * * * *